US006920783B2

(12) United States Patent
Kesler

(10) Patent No.: US 6,920,783 B2
(45) Date of Patent: Jul. 26, 2005

(54) AUTOMOTIVE IGNITION MONITORING SYSTEM WITH MISFIRE AND FOULED PLUG DETECTION

(75) Inventor: Scott B. Kesler, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 379 days.

(21) Appl. No.: 09/829,365

(22) Filed: Apr. 9, 2001

(65) Prior Publication Data
US 2002/0144544 A1 Oct. 10, 2002

(51) Int. Cl.[7] .............................................. G01M 15/00
(52) U.S. Cl. ..................................... 73/118.1; 73/118.1
(58) Field of Search ........................... 73/35.02, 35.08, 73/116, 117.2, 117.3, 118.1, 204.15, 862.333

(56) References Cited

U.S. PATENT DOCUMENTS 6,032,650 A * 3/2000 Rask .......................... 123/435
6,263,727 B1 * 7/2001 Butler, Jr. .................. 73/117.2
6,453,733 B1 9/2002 Malaczynski et al.
6,560,526 B1 5/2003 Matekunas et al.

OTHER PUBLICATIONS

U.S. Appl. No. 09/527,889, filed Mar. 20, 2001.

* cited by examiner

Primary Examiner—Namand Cuneo
Assistant Examiner—Monica D. Harrison
(74) Attorney, Agent, or Firm—Stefan V. Chmielewski

(57) ABSTRACT

An automotive ignition diagnostic system includes an ion current detection circuit producing a buffered representation of an ion current flowing across an electrode gap of an ignition plug in response to a bias voltage applied thereto. An ignition diagnostic circuit is responsive to the buffered representation of the ion current to charge a single integration capacitor. The diagnostic circuit is operable to produce an output signal having a pulse width defined by the amount of charge on the capacitor. When the ion current flows following a combustion event, the width of the output signal is controlled as a function of the quality of combustion in the corresponding cylinder. However, if sufficient ion current flows prior to combustion, the width of the output signal is controlled to indicate a fouled ignition plug.

12 Claims, 3 Drawing Sheets

AUTOMOTIVE IGNITION MONITORING SYSTEM WITH MISFIRE AND FOULED PLUG DETECTION

TECHNICAL FIELD

The present invention relates generally to automotive ignition systems, and more specifically to automotive ignition monitoring systems for diagnosing misfire and fouled plug failure conditions.

BACKGROUND OF THE INVENTION

Modern automotive ignition systems are increasingly dependent upon operational and diagnostic information to control internal combustion engine operation. One of the difficult challenges facing designers of modern engine control systems is to use such information to provide for satisfactory engine performance while also maintaining engine emissions below increasingly aggressive emissions standards mandated by government agencies. One particular concern in providing such control is the quality of combustion of the air-fuel mixture in the individual cylinders of the engine. Absent or incomplete combustion not only compromises engine performance, but also represents a significant pollution hazard.

A number of factors are known to contribute to poor combustion quality including, for example, misfire and fouled ignition plug conditions. Diagnostic systems for detecting combustion related problems such as misfire or fouled plug conditions are known and rely on various engine operating conditions to discriminate fault or failure conditions. One such known diagnostic system is operable to detect combustion as well as other engine performance parameters as a function of ion current flowing across the ignition plug electrode gap. However, such ion current-based systems are typically limited to determining only whether per-cylinder combustion has, or has not, occurred. What is needed is an ion-current based system for determining not only whether combustion has occurred, but for further determining the quality of the combustion event if it does occur and for diagnosing the overall health of the ignition plug.

SUMMARY OF THE INVENTION

The foregoing shortcomings of the prior art are addressed by the present invention. In accordance with one aspect of the present invention, an ignition diagnostic system for an internal combustion engine comprises an ignition coil having a primary coil coupled to a secondary coil, the secondary coil connected across an electrode gap of an ignition plug, means for producing a bias voltage across the electrode gap during a period of time following generation of a spark across the gap, a detection circuit producing a buffered version of any ion current flowing across the electrode gap resulting from the bias voltage, and a diagnostic circuit responsive to the buffered version of the ion current to produce an output signal, the output signal defining a pulse width indicative of combustion quality that is proportional to an amount of the ion current flowing across the electrode gap.

In accordance with another aspect of the present invention, an ignition diagnostic system for an internal combustion engine comprises an ignition coil having a primary coil coupled to a secondary coil, the secondary coil connected across an electrode gap of an ignition plug, a bias circuit producing a bias voltage across the electrode gap during a period of time prior to generation of a spark across the gap, a detection circuit producing a buffered version of any ion current flowing across the electrode gap resulting from the bias voltage, and a diagnostic circuit responsive to at least some amount of the buffered version of the ion current to produce an output signal defining a pulse width indicative of a fouled plug condition.

In accordance with a further aspect of the present invention, an ignition diagnostic system for an internal combustion engine comprises an ignition coil having a primary coil coupled to a secondary coil, the secondary coil connected across an electrode gap of an ignition plug, a bias circuit producing a bias voltage across the electrode gap during a period of time following generation of a spark across the gap, a detection circuit producing a buffered version of any ion current flowing across the electrode gap resulting from the bias voltage, and a diagnostic circuit producing an output signal defining a pulse width indicative of a non-combustion event if the detection circuit fails to detect ion current flowing across the electrode gap resulting from the bias voltage.

One object of the present invention is to provide a diagnostic circuit for detecting a fouled ignition plug and reporting this information to a control circuit.

Another object of the present invention is to provide a diagnostic circuit for detecting varying degrees of combustion quality and reporting this information to a control circuit.

A further object of the present invention is to provide a diagnostic circuit for detecting non-combustion conditions and reporting this information to a control circuit.

Still a further object of the present invention is to provide such a diagnostic circuit operable in either a multi-charge ignition system or a single strike ignition system.

These and other objects of the present invention will become more apparent from the following description of the preferred embodiment.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
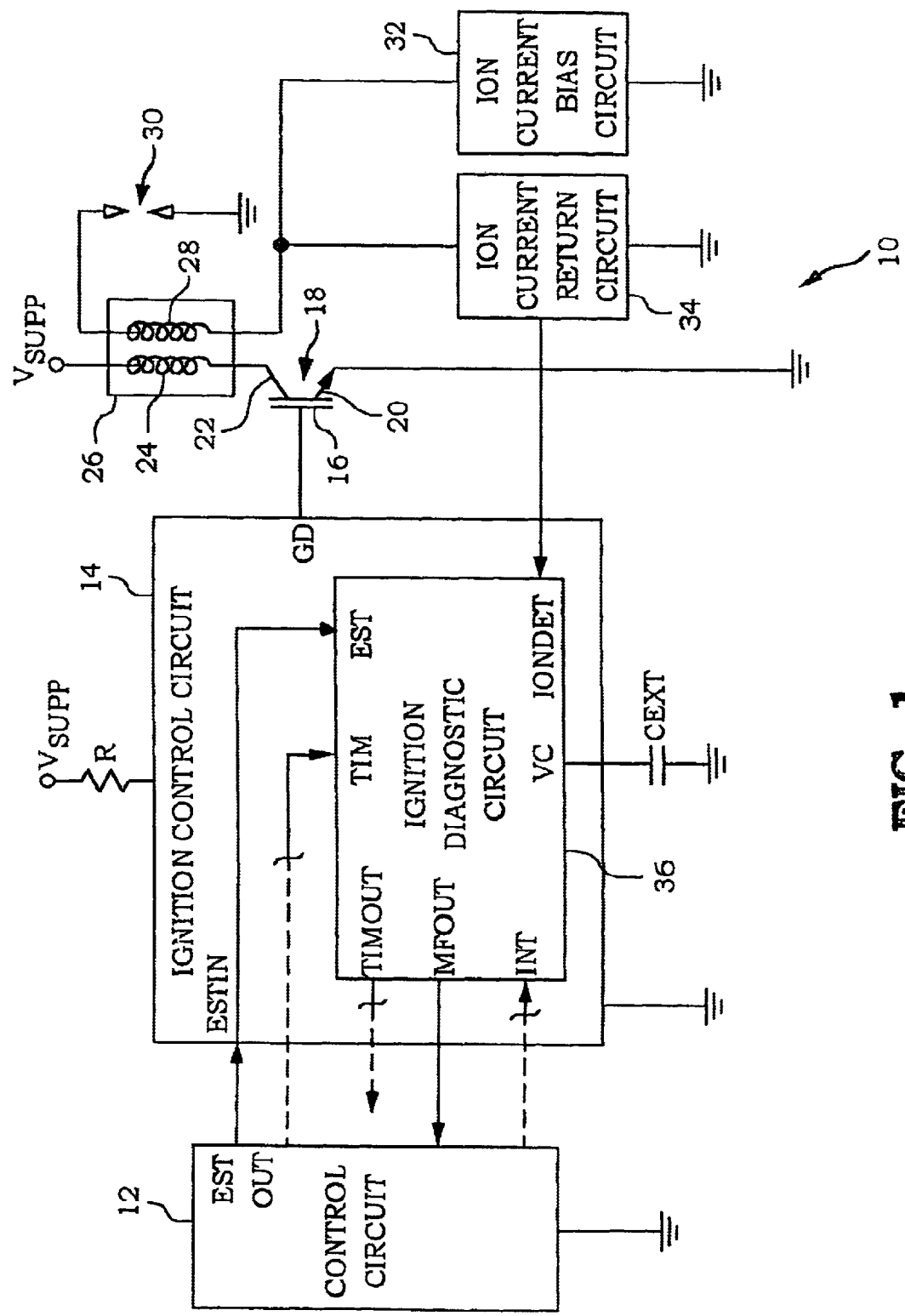
FIG. 1 is a diagrammatic illustration of an automotive ignition control system including one preferred embodiment of an ignition diagnostic circuit in accordance with the present invention.

Referring now to FIG. 1, an automotive ignition control system 10, including one preferred embodiment of an ignition diagnostic circuit 36 in accordance with the present invention, is shown. System 10 includes a control circuit 12 of known construction producing an electronic spark timing (EST) signal at an output EST OUT based on various engine operating and ignition system parameters as is known in the art. An ignition control circuit 14 includes known circuitry operable to receive the EST signal at input EST IN and produce a gate drive signal GD corresponding thereto. An ignition coil switching device 18 is provided to control the operation of a primary coil 24 of an automotive ignition coil 26 in a known manner to thereby control the timing and duration of spark discharge across the electrodes of an ignition plug 30 connected between one end of a secondary coil 28 and ground potential, wherein the secondary coil 28 is coupled to the primary coil 24 in known fashion. In one embodiment, the coil switching device 18 is an insulated gate bipolar transistor (IGBT) having a gate 16 electrically connected to circuit 14 and receiving the gate drive signal GD thereat, a collector 22 connected to one end of the primary coil 24 and an emitter 20 connected to ground potential. Those skilled in the art will recognize, however, that the coil switching device 18 may alternatively be another known switching device. Examples of such alternate switching devices include, but are not limited to, a metal-oxide-semiconductor field effect transistor (MOSFET), one or more bipolar junction transistors (BJT), relay device, and the like. In any case, the opposite end of primary coil 24 is electrically connected to a supply voltage $V_{SUPP}$, as is ignition control circuit 14 through resistor R, and the opposite end of the secondary coil 28 is connected to an ion current bias circuit 32 and to an ion current return circuit 34, both of which are referenced at ground potential. Circuits 32 and 34 are preferably of known construction, and the operation of each of these circuits, as they relate to the present invention, will be described in greater detail hereinafter.

According to conventional operation of system 10, the ignition control circuit 14 is operable to convert the EST signal to a gate drive signal GD, and the coil switching device 18 is responsive to a high level gate drive signal GD to energize the primary coil 24 to allow charging thereof. The coil switching device 18 is further responsive to a low level gate drive signal GD to disallow current flow through the primary coil 24, thereby generating a spark at the gap of the ignition plug 30. The ion current bias circuit 32 uses any of a number of known mechanisms for producing a bias voltage across the plug gap after at least one spark event has occurred. This bias voltage causes an ion current to flow across the gap of the ignition plug 30 if any degree of combustion has occurred or if the plug 30 is sufficiently fouled.

In accordance with the present invention, ignition control circuit 14 includes an ignition diagnostic circuit 36, and the ion current produced by the ignition plug bias voltage is provided to an ion current detection input IONDET thereof via ion current return circuit 34. Diagnostic circuit 36 is operable to process the ion current supplied by the ion current return circuit 34, in a manner to be more fully described hereinafter, and produce a variable-width pulse at output MFOUT at the end of the ignition sequence. This sequence may be either a single spark event or a series of spark events occurring over an extended time into the burn period, and in any event information regarding the quality of combustion and the overall health of the ignition plug 30 is encoded into the MFOUT pulse by controlling the width of the MFOUT pulse. In one preferred embodiment, diagnostic circuit 36 produces a minimum combustion quality pulse width (e.g., 100 μs) at MFOUT if no ion current, and therefore no combustion of the air-fuel mixture, is detected. This minimum-width pulse also serves as a diagnostic pulse indicating that the detection circuitry, comprising circuits 32, 34 and 36, is present and active. As combustion quality increases, diagnostic circuit 36 is preferably operable to increase the MFOUT pulse width up to a maximum combustion quality pulse width (e.g., 600 μs) indicative of complete combustion. Any MFOUT pulse width between the minimum and maximum combustion quality pulse widths linearly describes the amount of ion current detected, and hence the quality of combustion.

A bias voltage is also applied to the electrode gap of the ignition plug 30 at the initiation of the EST signal. With a normally operating ignition plug 30, no ion current should flow across the electrode gap in this pre-combustion time frame. However, if a discernable amount of ion current flow is detected across the electrode gap at this point in time, the ignition plug 30 must be fouled. In accordance with the present invention, the diagnostic circuit 36 is operable to monitor ion current flow during initiation of the EST signal, and to produce any fouled plug information via the MFOUT signal at the end of the ignition sequence. In one preferred embodiment, diagnostic circuit 36 is operable to encode-fouled plug information into the MFOUT signal by reducing the MFOUT pulse width to approximately ½ of the width of the minimum combustion quality pulse width (e.g., 50 μs). It is to be understood, however, that the present invention contemplates other pulse widths for indicating a fouled plug condition, although any such pulse width must necessarily be sufficiently wide to allow detection thereof, yet sufficiently narrow to allow the fouled plug pulse width to be discriminated from the minimum combustion quality pulse width.

The MFOUT output of the ignition diagnostic circuit 36 is electrically connected to an input of control circuit 12, wherein control circuit 12 is preferably operable to decode the MFOUT signal and act upon information provided thereby. Ignition diagnostic circuit 36 also includes an EST input receiving the EST signal provided to the ESTIN input of ignition control circuit 14, and a capacitor voltage input VC connected to an external capacitor CEXT. Those skilled in the art will recognize that capacitor CEXT may alternatively be included within ignition diagnostic circuit 36, but for package and integrated circuit sizing concerns is preferably provided as a discrete capacitor external to the ignition control circuit 14.

In one preferred embodiment of the present invention, the ignition system 10 illustrated in FIG. 1 is a multi-charge ignition system using a "make voltage" to bias the electrode gap of the ignition plug 30. In a "make voltage" system, the ignition plug gap is biased by re-energizing the coil switch device 18 after an initial spark event has been created. When turned on with sufficient gate drive voltage GD, the collector to emitter voltage across the coil switching device 18 decreases rapidly. This decrease in voltage across device 18 requires a countering increase in voltage across the primary winding 24 of the ignition coil 26. This voltage remains present for an extended time (several milliseconds, depending on coil winding parameters) since the inductive nature of the coil 26 prevents an instantaneous increase in coil current. This voltage is reflected onto the secondary winding 28 of the coil 26 and multiplied by the ratio of the number of secondary winding turns to the number of primary winding turns. The resulting voltage across the secondary coil 28 is sufficient to properly bias the electrode gap of the ignition plug 30 and produce ion current if any free ions have been produced by a combustion event.

The ignition diagnostic circuit 36 for the multi-charge system just described further includes a multi-charge current timing input TIM receiving a timing signal from an external source. In one embodiment, TIM may be generated internally to the ignition control circuit 14, or may alternatively be generated by control circuit 12 as shown in phantom in FIG. 1. In either case, TIM is preferably activated in this embodiment coincident with deactivation of the EST signal, and is deactivated coincident with the end of the ignition sequence, with a number of coil recharge events occurring therebetween. Ignition diagnostic circuit 36 further includes an integration input INT receiving an integration timing signal from an external source. In one embodiment, INT may be generated internally to the ignition control circuit 14, or may alternatively be generated by control circuit 12 as shown in phantom in FIG. 1. In either case, INT is preferably activated in this embodiment coincident with activation of the EST signal and thereafter for only a fraction of each coil recharging event during a period when the make voltage bias is present. In this embodiment, ignition diagnostic circuit 36 also preferably includes a multi-charge current timing output TIMOUT providing a pulse coincident with deactivation of MFOUT to thereby indicate that combustion has occurred prior to the end of the multicharging sequence. Circuitry external to ignition diagnostic circuit 36 may then terminate the multi-charging sequence immediately to minimize wear on the ignition plug 30. One embodiment of an external circuit for terminating the multi-charging sequence under such conditions is described in co-pending U.S. patent application Ser. No. 09/527,889, the disclosure of which is incorporated herein by reference.

As an alternative to the make bias multi-charge system just described, the present invention contemplates that ignition system 10 may be a non multi-charge system using any of a variety of known mechanisms and/or techniques for biasing the electrode gap of ignition plug 30. In non multi-charge systems, ignition diagnostic circuit 36 may be easily modified to accommodate non multi-charge behavior, and any necessary changes to circuit 36 would be a mechanical step for a skilled artisan. In this embodiment, the TIM and INT signals provided by circuitry external to circuit 36 would also be modified such that TIM is deactivated much sooner than in the multi-charge system (although still coincident with the end of the ignition sequence), and INT consists of only a single pulse coincident with activation of EST. Although the present invention is applicable to both multi-charge and non multi-charge ignition systems, the following description of the structure and operation of the ignition diagnostic circuit 36 will be directed to one preferred logic configuration specific to the multi-charge system implementation, it being understood that the concepts to be described hereinafter are directly applicable to non multi-charge systems.

Referring now to FIGS. 2A–2D, a number of timing diagrams are shown illustrating some of the input signals to the ignition diagnostic circuit 36 of the present invention along with the voltage VC across the integration/timing capacitor CEXT and the output voltage waveform MFOUT for a number of different operating scenarios. As described hereinabove, the input signals EST, TIM and INT are controlled by circuitry external to the ignition diagnostic circuit 36. In the embodiment of system 10 illustrated in FIG. 1, the capacitor CEXT is used as an integrator storage element, accumulating a buffered representation of the ion current flowing across the electrodes of the ignition plug 30 during short integration window periods. The amount of charge stored on the CEXT is then used to determine the width of the output pulse MFOUT by discharging CEXT at a known rate. This discharge rate must vary depending on whether the system has detected fouled plug, or if combustion quality is being measured. In the former case the discharge of CEXT occurs at a higher rate and charge is not allowed to accumulate during the combustion burn period. In the latter case, the discharge of CEXT occurs at a slower rate allowing for the longer pulse widths from which the control circuit 12 may distinguish the relative degree of combustion quality.

Figure 2A:
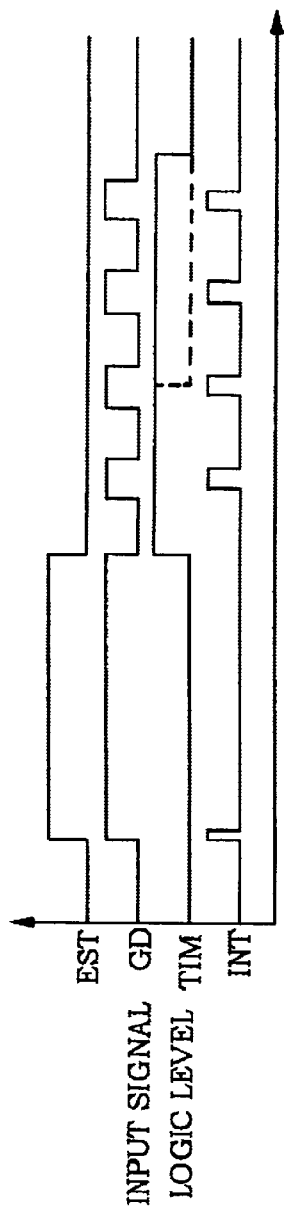
FIG. 2A is a plot of some of the logic signals associated with the ignition diagnostic circuit of FIG. 1 vs. time.

In FIG. 2A, EST signal as received from control circuit 12 lasts for only a fraction of the total ignition cycle, representing the first coil charging and discharging event. After EST is deactivated (falling edge of EST), the signal TIM goes high and remains high for the duration of the multi-charging period. During the time that TIM is active, the gate drive signal GD goes through several pulse cycles. These gate drive pulses cause the current through the primary coil 24 to repeatedly ramp up and then stop, resulting in a series of spark events across the electrode gap of the ignition plug 30. The periods of time that the buffered ion current supplied by ion current return circuit 34 is actually allowed to pass to the capacitor CEXT are determined by the input signal INT. Controlled externally to the invention circuitry, INT is active (logic high level) for only a fraction of each coil current recharging cycle, during a period when the make voltage bias is present. The windowing of the integration is chosen such that the ion current signal is not perturbed by voltage ringing noise that may be present at the initiation of each coil recharge period.

Figure 2B:
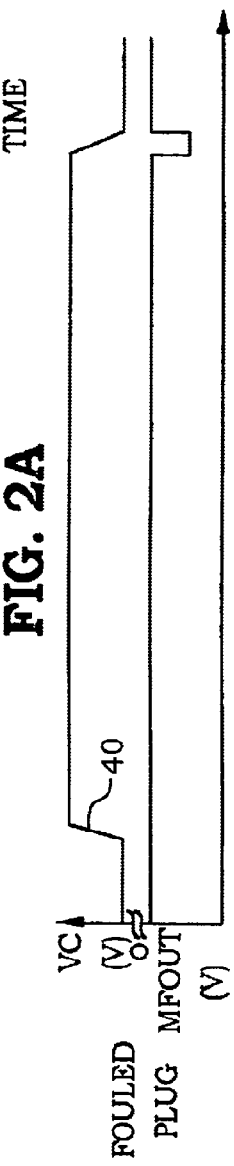
FIG. 2B is a plot of some of the output voltages of the ignition diagnostic circuit of FIG. 1 vs. time illustrating detection by the ignition diagnostic circuit of a fouled plug condition.
Figure 2C:
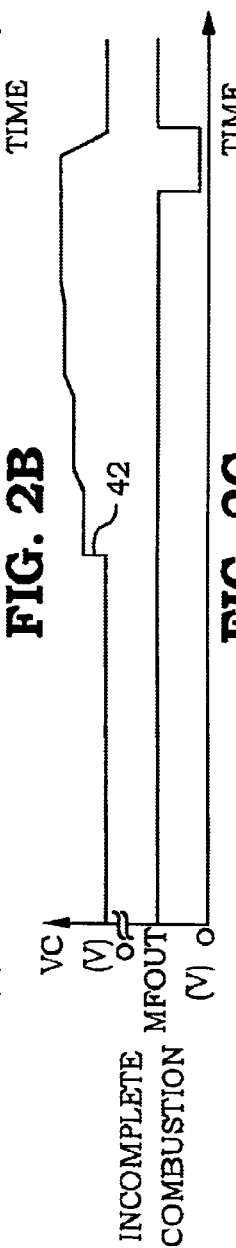
FIG. 2C is a plot of some of the output voltages of the ignition diagnostic circuit of FIG. 1 vs. time illustrating detection by the ignition diagnostic circuit of an example incomplete combustion condition.
Figure 2D:
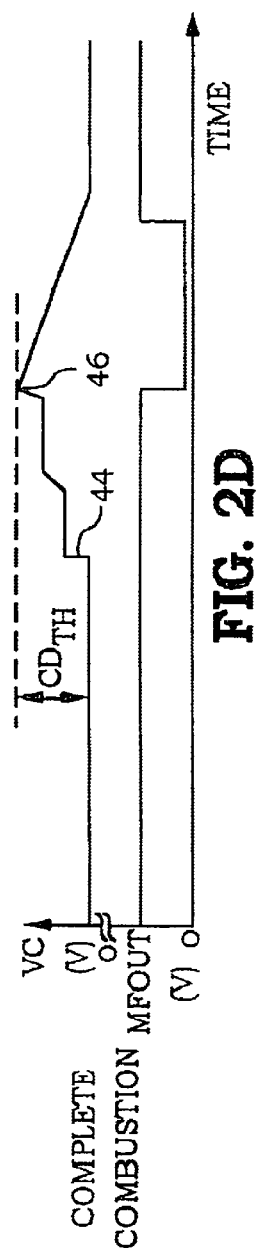
FIG. 2D is a plot of some of the output voltages of the ignition diagnostic circuit of FIG. 1 vs. time illustrating detection by the ignition diagnostic circuit of an example complete combustion condition.

FIGS. 2B–2D illustrate three possible scenarios for VC and MFOUT. The first, illustrated in FIG. 2B, represents a fouled plug condition where conduction across the plug gap following the rise of EST causes the voltage VC across CEXT to charge rapidly to a predefined internal voltage reference level as shown by VC waveform 40, and as will be described in greater detail hereinafter with respect to FIG. 3. When this reference level is reached, logic circuitry within diagnostic circuit 36 latches the event and the charge on CEXT is held until the end of the TIM period. When TIM is deactivated, the MFOUT goes low and remains low while CEXT is discharged at a predetermined rate, resulting in a MFOUT pulse width that will be interpreted by the control circuit 12 as indicative of a fouled plug.

A second operational scenario, illustrated in FIG. 2C, depicts a non-fouled plug, with an incomplete combustion event. At the end of the EST pulse, capacitor CEXT is pre-charged to a predetermined voltage as illustrated by waveform 42, and as will be described in greater detail hereinafter with respect to FIG. 3. This voltage defines the minimum MFOUT pulse width for a non-combustion event (i.e., the minimum combustion quality pulse width. As multi-charging of the ignition coil 26 proceeds, charge is accumulated on CEXT as long as detectable ion current is flowing across the electrodes of the ignition plug 30 as illustrated by waveform 42. In this scenario, while some charge is accumulated on CEXT, the total accumulated charge is insufficient to cause the voltage VC to reach an internal threshold voltage which signifies complete combustion. Thus, at the end of the multi-charging period (indicated by the falling edge of TIM), the width of the MFOUT pulse is defined by the time it takes to discharge CEXT with a predetermined discharge current. If no ion current was detected by ion current return circuit 34 and provided to diagnostic circuit 36 throughout the ignition sequence, the width of the MFOUT pulse is defined by the voltage to which the capacitor CEXT was pre-charged at the end of the EST pulse. The minimum combustion quality pulse width of MFOUT is thus defined by the pre-charging circuitry included within the ignition diagnostic circuit 36 as will be described in greater detail hereinafter with respect to FIG. 3.

A third operational scenario, illustrated in FIG. 2D, shows a non-fouled plug condition with complete combustion detected in the second multi-charge recharge make period. At the end of the EST pulse, capacitor CEXT is pre-charged to a predetermined voltage as illustrated by waveform 44, and as described hereinabove with respect to FIG. 2B. As multi-charging of the ignition coil 26 proceeds, charge is accumulated on CEXT as illustrated by waveform 44. In this scenario, when the voltage VC reaches a predefined combustion detection threshold voltage $CD_{TH}$, as illustrated by VC peak 46, the charging path to CEXT is disabled, thereby preventing further charging of CEXT. With the multi-charging period terminated earlier than in the previous two cases (as indicated by the dashed-line falling edge of TIM in FIG. 2A), the width of the MFOUT pulse is again defined by the time it takes to discharge CEXT with a predetermined discharge current. In this case, the width of the MFOUT pulse is defined by the voltage to which the capacitor CEXT was pre-charged at the end of the EST pulse plus additional the additional charge $CD_{TH}$. The maximum combustion quality pulse width of MFOUT is thus defined by sum of the pre-charge voltage and $CD_{TH}$ as will be more fully described in hereinafter with respect to FIG. 3.

In order to correctly interpret the ion current signals received from the ion current return circuit 34 during either of the fouled plug and non-fouled plug combustion events, the invention circuitry preferably utilizes two input current buffers with correspondingly different gains. Since the ion current typically received from circuit 34 during a fouled plug condition is substantially greater than the true ion current present during a combustion event, a first lower gain buffer is enabled during the first EST-driven energization of the primary coil 24. During subsequent ion current detection windows a second, higher gain buffer is enabled and the first lower gain buffer is disabled. The magnitudes of the gains of these two buffers should be carefully chosen to properly gauge the current flowing across the electrode gap of the ignition plug 30 during fouled plug and combustion operational scenarios to insure proper charging of the integration capacitor CEXT.

Similarly, in order to achieve the desired output pulse widths under fouled plug and combustion conditions, two separate capacitor discharging current sources are preferably included in the ignition diagnostic circuit 36. A first current source pulling a greater magnitude of current is enabled if the MFOUT pulse is to be transmitting a fouled plug condition. Otherwise, a second lower magnitude current source is enabled during discharge of CEXT to report combustion quality.

Figure 3:
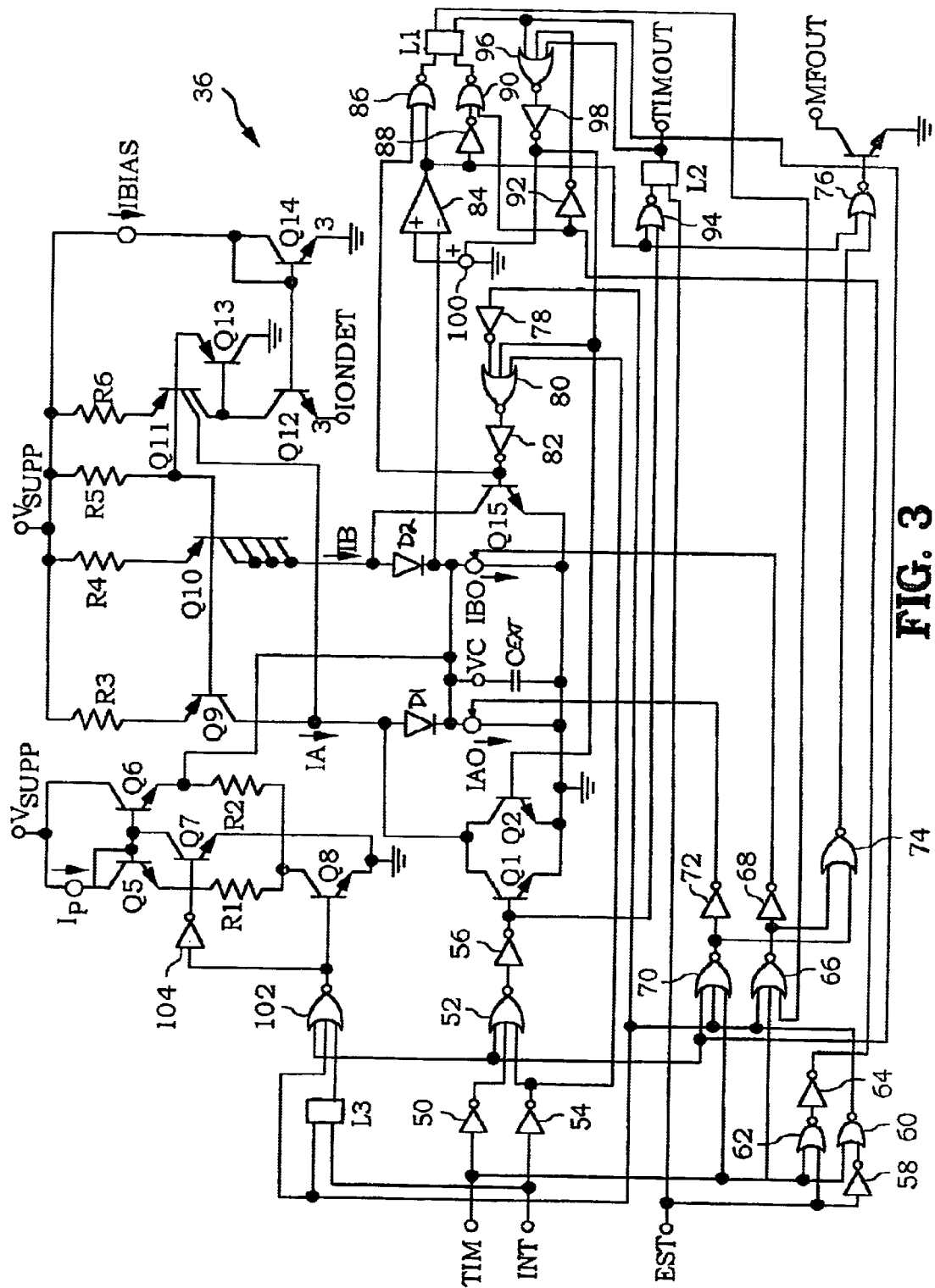
FIG. 3 is a device-level schematic diagram illustrating one preferred embodiment of the ignition diagnostic circuit of FIG. 1, in accordance with the present invention.

Referring now to FIG. 3, a schematic diagram illustrating one preferred device-level embodiment of the ignition diagnostic circuit 36 of FIG. 1, in accordance with the present invention, is shown. Preferably, circuit 36 is included within ignition control circuit 14, wherein the entire circuit 14 is implemented as a stand-alone integrated circuit manufactured in accordance with a known integrated circuit fabrication process. Alternatively, the ignition diagnostic circuit 36 may be fabricated as an integrated circuit separate from ignition control circuit 14, or may be provided as an amalgamation of one or more subcircuits and/or discrete devices. In any case, the capacitor CEXT is preferably provided as a discrete component external to circuits 14 and 36 to reduce cost and packaging volume, although the present invention contemplates that CEXT may alternatively be up-integrated into either of the circuits 14 or 36 as desired. In any event, to facilitate an understanding of the ignition diagnostic circuit of the present invention, the following description of the device-level schematic of FIG. 3 will be partitioned into the following sections:

Ion current detection buffer section

Capacitor charging/discharging integration control section

Fouled plug/combustion detection section

Capacitor pre-charge section

Ion Current Buffer Section:

Ion current flowing across the electrode gap of the ignition plug 30 is transferred to the ignition circuit 36 of the present invention via the ion current return circuit 34 as shown in FIG. 1, wherein circuit 34 may be configured to accomplished this task by any number of known mechanisms and/or techniques. Regardless of the ion current transfer technique used by circuit 34, ignition diagnostic circuit 36 is preferably configured such that a current flowing out of the IONDET terminal of circuit 36 is proportional to the ion current flowing across the electrode terminals of the ignition plug 30. In the embodiment of circuit 36 illustrated in FIG. 3, this current flowing out of the IONDET terminal is supplied by the emitter of transistor Q12. Q12 is biased at its base by connection to diode-connected transistor Q14, and with bias current IBIAS flowing through the base-emitter junction of Q14, any current pulled out of the emitter of Q12 will result in a nearly identical current flowing into the collector of Q12. The Q12 collector current establishes a bias current for transistor Q11, and the resulting voltage across Q11's base-emitter junction, along with the voltage drop across R6, forms a reference voltage for a dual-output current mirror having one output defined by the collector of Q9 and one half of a collector of Q11, and another output defined by the collector of Q10. Two outputs are needed so that the two different ion current gain factors can be developed for use in the fouled plug and combustion detection phases of operation. The emitter areas of Q9 and Q10 relative to the emitter area of Q11 determine, in part the magnitude of the current multiplication. The other factor in setting up the gains are the values of R3 and R4 relative to R6. The calculations for determining the gain factors can easily be calculated by one skilled in the art.

The absolute value of the gains of the two current mirror outputs are dependent upon understanding the magnitudes of the currents flowing across the electrode gap of the ignition plug 30 in both the fouled plug scenario, and the non-fouled/combustion detection scenario. Those skilled in the art will recognize that the parameters required to set the gain values for the two current mirror outputs are typically dictated by the specific application of circuit 36. The collectors of Q9 and Q11 establish a current IA, which is used by circuit 36 to charge capacitor CEXT for combustion quality determinations, and the collector of Q10 establishes a current IB, which is used by circuit 36 to charge capacitor CEXT for fouled ignition plug determinations.

Integrator Charge/Discharge Control Section:

As described hereinabove, the fouled plug detection period exists prior to the combustion induced ion current integration period. A fouled plug is detected by using the make voltage bias present immediately following the initial energizing of the coil switching device 18 following the rising edge of the EST pulse. At this time it is necessary to direct the current IB to the integrating capacitor CEXT, and to inhibit the current IA from charging CEXT. Additionally, during the combustion integration periods, not only does IB have to be directed away from CEXT, but the pulse width establishing discharge currents illustrated as IAO and IBO must also be turned off so as not to remove charge from CEXT.

The steering of IA and IB is accomplished with the inclusion of diodes D1 and D2 in a series with the IA and IB current sources respectively. When either IA or IB is not intended to add charge to CEXT, these currents are redirected to ground by turning on either transistor Q1 or Q2 in the case of redirecting IA, or by turning on transistor Q15 in the case of redirecting IB. When any of these transistors are turned on, the diode in series with the associated current source becomes reverse biased, thereby allowing redirection of the charging current (IA or IB) without allowing charge already accumulated on the capacitor CEXT to be removed. The control of Q1, Q2, Q15, as well as the switching of current sources IAO and IBO to inhibit unwanted bleeding of charge from CEXT, is handled via logical combinations of the input signals EST, TIM, and INT. These logical controls are handled directly by inverters 50, 54, 56, 68, 72, 78, 82, as well as NOR gates 52, 70, 74 and 80. Q2 is controlled by the output of inverter 98. The four operational conditions resulting from the logic circuitry can be described as follows:

IA charges CEXT if:
TIM=High
INT=High
Latch L1 is reset (no fouled plug detected)
Latch L2 is reset (combustion detection threshold has not been reached)
L1 is reset if the capacitor voltage VC is less than the low reference voltage of voltage source 100, and the output of inverter 64 is low.
L2 is reset when EST is high.

IB charles CEXT if:
INT=High
EST=High
TIM=Low
L1 reset
L2 is reset

IBO is turned on when:
TIM=Low
EST=Low
L1 is set

IAO is turned on when:
TIM=Low
EST=Low
L1 is reset

Fouled Plug/Combustion Detection Section:

The mechanism by which either a fouled plug or combustion quality is recorded is as follows. Comparator 84 has a reference voltage source 100 connected to its non-inverting input that can assume either of two levels. The high level is used to determine when sufficient charge has been accumulated on CEXT to declare either the presence of a fouled plug (during the fouled plug detection period following the rise of EST), or a "complete" combustion event. When the output of inverter 98 is low, reference voltage source 100 is placed into its high output level state (e.g., 2.5 volts). This occurs when the output of inverter 64 (TIM OR'ed with EST) is high, latch L1 is reset (no fouled plug detected) and latch L2 is reset (the voltage on CEXT has not yet reached the high voltage level of reference voltage source 100). The "set" and "reset" inputs of latch L1 are fed by the outputs of NOR gate 86 and 90 respectively, and a Q' output of L1 feeds one input of NOR gate 66 while the Q output of L1 feeds inputs of NOR gates 52, 70, 96 and 102.

The "set" and "reset" inputs of latch L2 are fed by the output of NOR gate 94 and the EST signal respectively, and the Q output of L2 defines the TIMOUT output. In any case, this set of conditions can occur either during the fouled plug detection period, or during coil current switching device drive periods that occur during the multi-charge period. During either of these periods, ion current that appears at input IONDET causes CEXT to accumulate more charge.

If, in either case, CEXT is sufficiently charged so as to cause the voltage across it to become greater than the high voltage level of the reference voltage source 100, comparator 84 outputs a low logic level signal. At this time, if the output of inverter 82 is low, indicating that IB is being directed to CEXT, NOR gate 86 outputs a high level signal, setting foul detection latch L1. If the output of inverter 56 is low, indicating that IA is being directed to CEXT, NOR gate 94 outputs a high level signal, setting combustion quality detection latch L2. In either case, once the output of converter 84 goes low, the output of NOR gate 96 goes low causing the output of inverter 98 output to switch to a high level. A high level output from inverter 98 causes the reference voltage source 100 to produce a low level voltage (e.g., 0.2 volts). This low level voltage reference defines the level to which CEXT will be discharged, thereby establishing the end of the MFOUT pulse. Besides lowering the output voltage of the reference voltage source 100 when combustion is detected, the output of L2 may also be used to terminate the multi-charging period by providing a high level signal at the TIMOUT output.

In the case of a detected fouled plug, L1 is set and several other events occur. IAO is disabled via NOR gate 70 and inverter 72. The pre-charging circuitry is also disabled, preventing it from modifying the voltage VC on CEXT at the start of the multi-charging period. Additionally, Q1 is turned on via NOR gate 52 and inverter 56. This directs the buffered ion current IA to ground so that no additional charging of CEXT occurs during the multi-charge period. Q15 is also turned on due to a high level signal at the output of inverter 98, thereby directing IB to ground. This additionally prevents charging of CEXT beyond the higher reference voltage of the reference voltage source 100. Finally, the high level output produced by inverter 98 causes the reference voltage source 100 to produce its low level voltage. This causes the output of comparator 84 to remain in a low state even after CEXT begins to discharge.

Once the multi-charging period is complete, as signaled by TIM going low, IBO is turned on, starting the discharge of CEXT. The output of NOR gate 70 is low at this time, and the output of NOR gate 66 is high. This causes the output of NOR gate 74 to go low, wherein the combination of low inputs at NOR gate 76 (produced by the outputs of NOR gate 74 and comparator 84) causes NOR gate 76 to activate MFOUT (drive MFOUT low), thereby beginning the MFOUT output active low pulse. This output remains in the low state until CEXT is discharged to a voltage less than the low voltage level of the reference voltage source 100. At this time the output of comparator 84 goes high, resulting in the output of NOR gate 76 going low, thereby deactivating MFOUT (driving MFOUT high) and terminating the MFOUT pulse.

If there is no fouled plug detected, the operational sequence of circuit 36 is similar to that just described except that L1 is never set. This allows the charging of CEXT via IA rather than by IB. This happens since Q2 is held off by the low level output of inverter 98 resulting from: 1) L1 not being set, 2) the output of inverter 64 being high (during the multi-charge coil charging periods), and 3) L2 not yet having been set. When the output of inverter 60 is high or INT is high, NOR gate 80 causes inverter 82 to output a high level signal which turns on Q15. This redirects IB to ground, thereby preventing it from charging CEXT. Under these conditions, if ion current is present across the electrode gap of ignition plug 30, IA is allowed to charge CEXT. If the voltage VC on CEXT reaches the high level voltage produced by reference voltage supply 100, the output pulse at MFOUT is generated in the same way as described in the fouled plug case above.

If, however, the voltage VC on CEXT does not reach the high level voltage produced by reference voltage supply 100 by the time TIM goes low, the output of inverter 98 is forced high due to the input of NOR gate 96 now being high (output of inverter 64=TIM OR EST where both TIM and EST are now low). This causes the reference voltage supply 100 to switch and produce its lower voltage level output. At the same time IAO is enabled by the output of inverter 72 since TIM, EST, and the non-inverting output of latch L1 are all low. This starts the discharge of CEXT which proceeds until the voltage VC on CEXT drops below the lower voltage level of the reference voltage source 100. During this discharge time NOR gate 76 drives MFOUT active, causing MFOUT to be low. MFOUT remains low until the output of comparator 84 changes state when the voltage VC across CEXT drops below the low voltage level of reference voltage source 100.

Resetting of L1 and L2 occur as follows: L1 is reset when the output of comparator 84 is high (VC<V100, wherein V100 is the voltage produced by reference voltage source 100) and both TIM and EST are low; and L2 is reset directly by the next rising edge of EST. These resets prepare the detection circuitry for the next EST/multi-charge cycle.

Capacitor Pre-Charging Section:

The minimum combustion quality pulse width for combustion detection is determined by the amount of initial charge placed on CEXT at the beginning of the multi-charging period, as described hereinabove. This pulse width is defined by the time that it takes for the voltage VC on capacitor CEXT to discharge from its pre-charge level to the lower voltage level of the reference voltage source 100. The capacitor pre-charging circuitry comprising transistors Q5–Q8, resistors R1 and R2 and current source $I_p$, is enabled when three conditions are met: 1) No fouled plug detected (non-inverting output of L1 is low), 2) the output of NOR gate 60 is low, and 3) the output of NOR gate 60 was previously been high (such that the output of latch L3 is low). The last two conditions occur as a result of the initial EST pulse. This set of conditions occurs at the end of the EST pulse, before the TIM period begins. When these conditions occur, the output of NOR gate 102 is high, turning on transistor Q8 and turning off Q7 (via inverter 104). The current $I_p$ biases the voltage at the emitter of Q5 to the desired pre-charge voltage. This voltage is reproduced at the emitter of Q6 due to the follower configuration of transistors Q5 and Q6. However, the voltage at the emitter of Q6, and therefore the voltage across CEXT, must equal that at the emitter of Q5. In order to achieve this, Q6 conducts current toward CEXT until the emitter voltages of Q5 and Q6 are equal.

Once INT goes high for the first time, latch L3 is reset, forcing NOR gate 102 to turn off the pre-charge circuitry by turning off the CEXT discharge path to ground through R2 and Q8. The reset of L3 also turns on Q7, forcing the bases of Q5 and Q6 to ground and thereby removing the CEXT charging path through Q6. At this time the voltage across CEXT corresponds to the minimum combustion quality pulse width. The "set" and "reset" inputs of latch L3 are fed by the outputs of NOR gate 60 and the INT input respectively, and the Q' output of L3 feeds one input of NOR gate 102.

It should now be apparent that the ignition diagnostic circuit 36 of the present invention is operable to monitor combustion quality via detection and measurement of ion current flowing across the electrode gap of an ignition plug 30 for a period of time after a spark has occurred. One preferred embodiment of the present invention uses a buffered version of the ion current to produce pulse-width width encoded information relating to combustion quality. Diagnostic circuit 36 is further operable to monitor the overall health of the ignition plug via detection and measurement of the ion current for a period of time prior to the combustion period (i.e., when no ion current should be flowing across the electrode gap of plug 30).

Information relating to combustion quality and ignition plug health is reported to a control circuit via a single wire, which may be bussed with a plurality of identical sensing systems, each dedicated to an individual engine cylinder. In one embodiment, the circuitry of the present invention performs all ion current integration and pulse width timing functions with a single capacitor CEXT to reduce cost and packaging volume. Preferably, although not necessarily, CEXT is implemented as a discrete capacitor external to the ignition diagnostic circuit 36 of the present invention.

The ignition diagnostic circuit 36 of the present invention is intended to be used in an ignition system implementing either a "multi-charging" ignition system wherein a series of spark discharges are produced during each firing event, or a "single-strike" ignition system wherein each firing event is defined by only a single spark discharge. In the former case, the biasing of the ignition plug gap may be accomplished using the "make" voltage resulting from the switching of the coil current switching device 18. In the latter case, any of a number of known ignition plug gap biasing mechanisms and/or techniques may be used.

While the invention has been illustrated and described in detail in the foregoing drawings and description, the same is to be considered as illustrative and not restrictive in character, it being understood that only one preferred embodiment has been shown and described and that all changes and modifications that come within the spirit of the invention are desired to be protected.

What is claimed is:

1. An ignition diagnostic system for an internal combustion engine comprising:

an ignition coil coupled to an electrode gap of an ignition plug;

means for producing a bias voltage across the electrode gap;

a current mirror circuit having an input receiving a buffered representation of an ion current flowing across the electrode gap resulting from the bias voltage and a pair of current mirror outputs producing first and second mirrored currents;

capacitor; and a logic circuit directing the first mirrored current to charge the capacitor if the ion current is detected during a first time period prior to generation of a spark across the electrode gap and thereafter directing discharge of the capacitor for fouled plug determination, the logic circuit directing the second mirrored current to charge the capacitor if the ion current is detected during a second time period following generation of a spark across the electrode gap and thereafter directing discharge of the capacitor for combustion quality determination.

2. The system of claim 1 wherein the current mirror output producing the first mirrored current has a first current gain associated therewith, and the current mirror output producing the second mirrored current has a second current gain associated therewith, the first current gain lower than the second current gain.

3. The system of claim 1 further including a diagnostic circuit producing an output signal having a pulse width defined by a discharge duration of the capacitor.

4. The system of claim 3 wherein the pulse width of the output signal is indicative of a fouled plug condition if the logic circuit directed the first mirrored current to charge the capacitor.

5. The system of claim 3 wherein the pulse width of the output signal is a measure of combustion quality if the logic circuit directed the second mirrored current to charge the capacitor.

6. The system of claim 3 wherein the logic circuit is configured to direct discharge of the capacitor at a first rate if the capacitor was charged with the first mirrored current, and to direct discharge of the capacitor at a second rate if the capacitor was charged with the second mirrored current, the first rate different than the second rate.

7. The system of claim 6 further including:
a first discharge current source producing a first discharge current; and
a second discharge current source producing a second discharge current, the first discharge current greater than the second discharge current;
and wherein the logic circuit is configured to direct the first discharge current to discharge the capacitor for fouled plug determination, and to direct the second discharge current to discharge the capacitor for combustion quality determination.

8. The system of claim 7 further including a diagnostic circuit producing an output signal having a pulse width defined by a discharge duration of the capacitor.

9. The system of claim 8 wherein the pulse width of the output signal is indicative of a fouled plug condition if the logic circuit directed the first discharge current to discharge the capacitor.

10. The system of claim 8 wherein the pulse width of the output signal is a measure of combustion quality if the logic circuit directed the second discharge current to discharge the capacitor.

11. An ignition diagnostic system for an internal combustion engine comprising:
an ignition coil coupled to an electrode gap of an ignition plug;
means for producing a bias voltage across the electrode gap;
a capacitor;
a first charging circuit pre-charging the capacitor to a precharge level at the onset of generation of a spark across the electrode gap;
a second charging circuit charging the capacitor based on detection of an ion current flowing across the electrode gap resulting from the bias voltage during a period of time following generation of the spark across the electrode gap; and
a logic circuit directing discharge of the capacitor and producing an output signal having a pulse width corresponding to a duration of capacitor discharge, the output signal having a minimum pulse width in the absence of detection of the ion current, the minimum pulse width corresponding to the duration of capacitor discharge from the precharge level to a lower threshold level.

12. An ignition diagnostic system for an internal combustion engine comprising:
an ignition coil coupled to an electrode gap of an ignition plug;
means for energizing the ignition coil;
means for producing a bias voltage across the electrode gap;
a capacitor;
a charging circuit producing a charging current based on detection of an ion current flowing across the electrode gap resulting from the bias voltage just after energizing the ignition coil; and
a logic circuit directing charging of the capacitor with the charging current and thereafter directing discharge of the capacitor, the logic circuit producing an output signal having a pulse width corresponding to a duration of capacitor discharge, the output signal having a pulse width indicative of a fouled plug condition.

* * * * *